No. 750,738. Patented January 26, 1904.

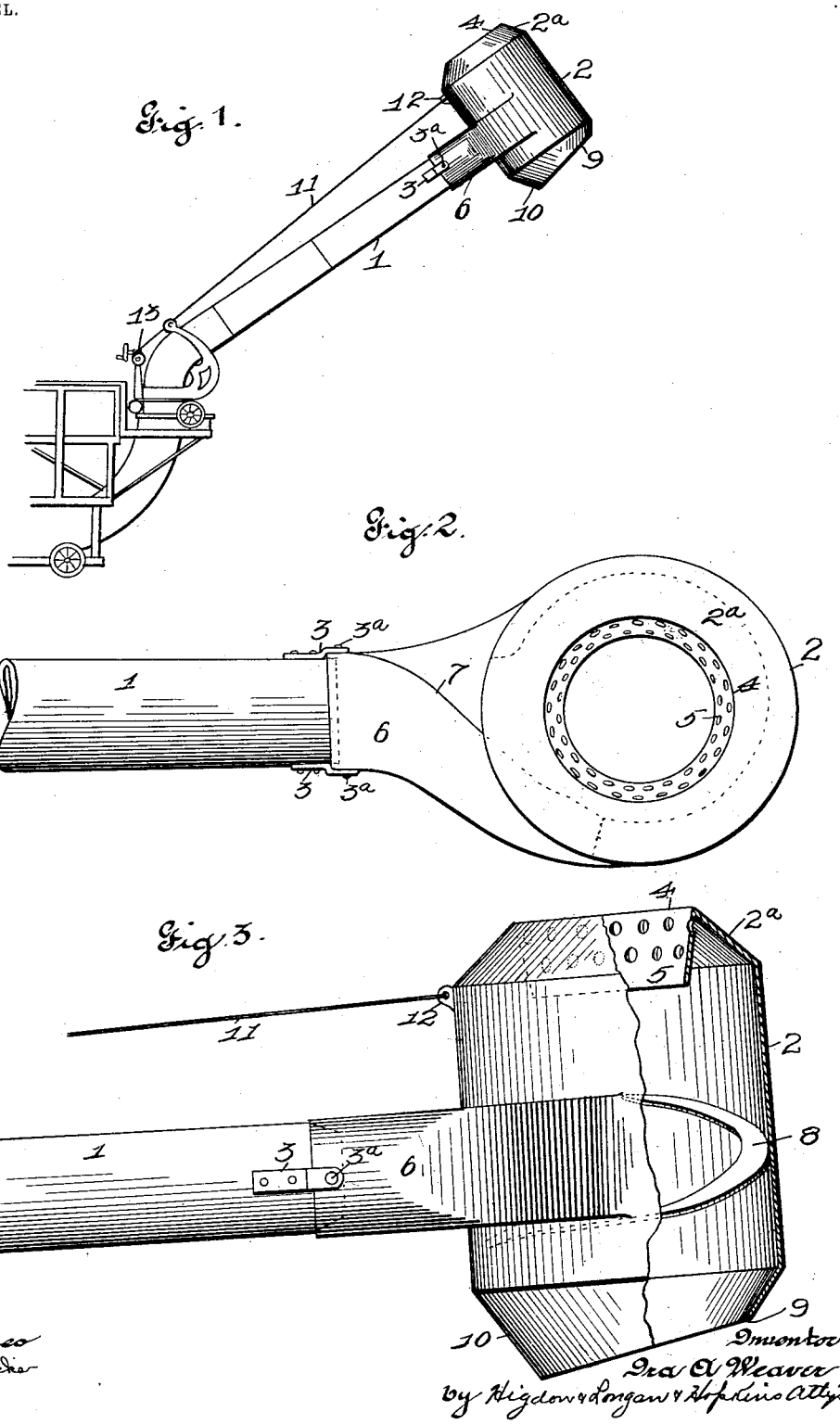

UNITED STATES PATENT OFFICE.

IRA A. WEAVER, OF SPRINGFIELD, ILLINOIS, ASSIGNOR OF ONE-HALF TO SAMUEL E. PRATHER AND CLYDE A. SATTLEY, OF SPRINGFIELD, ILLINOIS.

HOOD FOR PNEUMATIC STACKERS.

SPECIFICATION forming part of Letters Patent No. 750,738, dated January 26, 1904.

Application filed May 11, 1903. Serial No. 156,689. (No model.)

*To all whom it may concern:*

Be it known that I, IRA A. WEAVER, a citizen of the United States, residing at Springfield, Sangamon county, State of Illinois, have invented certain new and useful Improvements in Hoods for Pneumatic Stackers, of which the following is a specification containing a full, clear, and exact description, reference being had to the accompanying drawings, forming a part hereof.

My invention relates to improvements in hoods for pneumatic stackers, and has for its object to provide means on the outer end of a stacker-tube that will effectually separate the straw and chaff from the dust and blast of air used to blow it through the tube to the stack.

In the art to which my invention relates mingled straw, chaff, dust, and air are discharged through a chute with great force. This force is so great as to render it extremely difficult for men to work about the discharge in building straw-stacks, so that such labor is exceedingly objectionable and the laborers are reluctant to enter upon such work. Furthermore, in the case of the chutes now used and in which the passage of the contents of the chute is unimpeded the straw is discharged into the stack end first, and the result is a stack in which the straw will admit rain and snow and in which the straw will consequently fail to keep as well as in stacks built by hand.

My invention is intended to overcome these defects in the prior art by providing the pneumatic stacker with means for discharging the straw at the feet of the men engaged in building the straw-stack, while protecting them from exposure to the direct impact of the mingled column of air, dust, chaff, and straw which is discharged from the pneumatic stacker, at the same time employing centrifugal force as a means of separating the discharged straw from the dust with which it is discharged.

In the drawings which form a part of this specification, Figure 1 is a side view of a pneumatic stacker of an attachment embodying my invention. Fig. 2 is a bottom view of a hood embodying my invention. Fig. 3 is a side view of a hood embodying my invention, showing portions broken away.

In the drawings the pneumatic stacker tube or chute 1 is of any ordinary construction. Upon the outer end of the chute 1 the drum 2 is transversely hinged by means of the straps 3 and the pivots $3^a$, whereby hinged connection is provided between the chute 1 and the drum 2.

The drum 2 is provided at its upper end with the truncated cone-shaped extension $2^a$ and the opening 4, from which the perforated collar 5 depends inwardly. The tube 6, through which the contents of the chute 1 is conducted into the drum 2, is provided with a deflecting-partition 7, which serves to direct the contents toward one side of the drum 2. Within the drum 2 and beginning at a point in a plane with the top of the tube 6 I have provided the spiral rib 8, which serves to engage the discharge from the chute 1 and assist the partition 7 in imparting a circular motion thereto and to lead the straw to the discharge-opening 9.

The discharge from the chute 1 will crowd to the wall of the drum 2 by reason of the circular motion thus imparted to the blast, and the perforated collar 5 will prevent the ready escape of the chaff and the like particles through the top opening, while the dust and air will readily pass therethrough. The straw escaping though the discharge-opening 9 will cause that opening to be more or less closed, which fact assists in forcing the air and dust out through the opening 4.

The discharge-opening 9 is formed by the lower end of the obliquely-truncated cone-shaped extension 10, in which the drum 2 terminates at its lower extremity, the side of the extension 10 next to the end of the chute 1 being lower than the outer side, which fact places the discharge-opening 9 in a plane at an angle to that of the chute 1, thus tending to discharge the straw outwardly and away from the drum 2 upon the stack.

By means of the hinged connection between the chute 1 and the drum 2 the drum 2 may be tipped back and forth in order to discharge the straw on the near or far side of the stack, as desired.

My preferred means for effecting the movement of the drum 2 consist of the cord 11, fastened to the lug 12 upon the upper end of the drum 2 and controlled by the windlass 13 to tilt the drum 2.

Having thus described my invention, what I claim as new, and desire to have secured to me by the grant of Letters Patent, is—

1. A hood for pneumatic stackers, consisting of a drum provided with means for imparting circular motion to the discharge from the stacker-tube, an upper discharge-opening, a depending perforated collar mounted within the upper discharge-opening, and a lower discharge-opening, substantially as and for the purposes specified.

2. A device of the class named, consisting of a drum adapted to be mounted upon the chute of a pneumatic stacker, the drum being provided with means for imparting a circular motion concentric with the longitudinal axis of the drum to the contents received by it from the chute, and means whereby the dust contained in such contents may be separated and ejected through the top of the drum and the straw ejected through the bottom of the drum, substantially as and for the purposes specified.

3. A hood for pneumatic stackers, consisting of a drum, a tube mounted upon the side of the drum, a deflecting-partition mounted within the tube, a spiral rib mounted within the drum, the drum being provided with openings at its ends, and a depending perforated collar within its upper end, substantially as and for the purposes specified.

4. A hood for pneumatic stackers, consisting of a drum, a tube extending from the side of the drum, a deflecting-partition mounted within the tube, a spiral rib mounted within the drum, the drum being provided with openings at its ends, a depending perforated collar within its upper end, and a hinge whereby the hood is pivotally mounted upon the outer end of the chute of a pneumatic stacker.

5. A hood for pneumatic stackers, consisting of a drum, a tube extending from the side of the drum, a deflecting-pattition mounted within the tube, a spiral rib mounted within the drum, the drum being provided with openings at its ends, a depending perforated collar within its upper end, a hinge whereby the hood is pivotally mounted upon the outer end of the chute of a pneumatic stacker, and means whereby the drum may be tipped back and forth in order to discharge the straw on the near or far side of the stack, substantially as and for the purposes specified.

6. A hood for pneumatic stackers, consisting of a drum adapted to be mounted upon the outer end of the chute of a pneumatic stacker, the drum being provided at each end with a cone-shaped extension surrounding its discharge-openings, the opening in the lower cone-shaped extension being truncated in a plane at an angle to the plane of the bottom of the drum, substantially as and for the purposes specified.

7. A hood for pneumatic stackers, consisting of a drum adapted to be mounted upon the outer end of the chute of a pneumatic stacker, provided with means whereby the dust and straw discharged from the chute may be separated, the dust discharged upwardly and the straw discharged downwardly, means whereby a circular motion concentric with the longitudinal axis of the drum may be imparted to the discharge received by the drum, and means whereby the dust may be separated and expelled vertically and the straw expelled downwardly, substantially as and for the purposes specified.

8. A hood for pneumatic stackers, consisting of a drum provided with means for imparting circular motion concentric with the longitudinal axis of the drum to the discharge from the stacker-tube, an upper discharge-opening, and a lower discharge-opening, substantially as and for the purposes specified.

In testimony whereof I have signed my name to this specification in presence of two subscribing witnesses.

IRA A. WEAVER.

Witnesses:
C. F. CLAPP,
HORACE WEBER.